(12) United States Patent
Coates et al.

(10) Patent No.: US 9,315,930 B2
(45) Date of Patent: Apr. 19, 2016

(54) NONWOVEN TEXTILE MADE FROM SHORT FIBERS

(75) Inventors: Michael William Coates, Glen Iris (AU); Marek Henryk Kierzkowski, Ferntree Gully (AU); Philip John Gibbons, Hughesdale (AU); Alfred Johannas Eiden, Templestowe (AU)

(73) Assignee: Zephyros, Inc., Romeo, MI (US)

( * ) Notice: Subject to any disclaimer, the term of this patent is extended or adjusted under 35 U.S.C. 154(b) by 133 days.

(21) Appl. No.: 13/132,886

(22) PCT Filed: Dec. 4, 2009

(86) PCT No.: PCT/AU2009/001584
§ 371 (c)(1),
(2), (4) Date: Aug. 23, 2011

(87) PCT Pub. No.: WO2010/063079
PCT Pub. Date: Jun. 10, 2010

(65) Prior Publication Data
US 2011/0293911 A1   Dec. 1, 2011

Related U.S. Application Data

(60) Provisional application No. 61/119,945, filed on Dec. 4, 2008.

(51) Int. Cl.
*D04H 1/4274* (2012.01)
*D04H 1/4382* (2012.01)
(Continued)

(52) U.S. Cl.
CPC *D04H 1/70* (2013.01); *B32B 5/022* (2013.01); *B32B 5/18* (2013.01); *B32B 5/245* (2013.01);
(Continued)

(58) Field of Classification Search
CPC ..... D04H 1/42; D04H 1/4274; D04H 1/4382; D04H 1/54; D04H 1/541; D04H 1/559; D04H 1/58; D04H 1/593; D04H 1/70; B32B 5/022; B32B 5/26; B32B 2262/12; B32B 2262/14; B32B 2307/102; G10K 11/162; B60R 13/08
USPC ................. 156/62.2, 62.4; 264/115, 123, 913
See application file for complete search history.

(56) References Cited

U.S. PATENT DOCUMENTS 3,978,179 A   8/1976   Sundhauss
5,401,567 A   3/1995   Knobloch
(Continued)

FOREIGN PATENT DOCUMENTS

DE   6930307 U   12/1969
DE   19714348   10/1998
(Continued)

OTHER PUBLICATIONS

Bies et al., *Engineering Noise Control Theory and Practice*, 3d ed., Spon Press, London, 2003, 741 pgs.
(Continued)

*Primary Examiner* — Michael Tolin
(74) *Attorney, Agent, or Firm* — The Dobrusin Law Firm, P.C.

(57) ABSTRACT

A method of forming a nonwoven material, the method comprising: receiving fibrous material comprising thermo-plastic fibers; processing the fibrous material to produce short fibers; adding the short fibers to a preformed web; and heating and optionally compressing the preformed web to form a nonwoven material.

21 Claims, 6 Drawing Sheets

(51) Int. Cl.
| | |
|---|---|
| *D04H 1/54* | (2012.01) |
| *D04H 1/58* | (2012.01) |
| *D04H 1/70* | (2012.01) |
| *D04H 1/541* | (2012.01) |
| *G10K 11/162* | (2006.01) |
| *B60R 13/08* | (2006.01) |
| *B32B 5/26* | (2006.01) |
| *D04H 1/559* | (2012.01) |
| *D04H 1/593* | (2012.01) |
| *B32B 5/02* | (2006.01) |
| *B32B 5/18* | (2006.01) |
| *B32B 5/24* | (2006.01) |
| *B32B 7/12* | (2006.01) |

(52) U.S. Cl.
CPC ... *B32B 5/26* (2013.01); *B32B 7/12* (2013.01); *B60R 13/08* (2013.01); *D04H 1/4274* (2013.01); *D04H 1/4382* (2013.01); *D04H 1/54* (2013.01); *D04H 1/541* (2013.01); *D04H 1/559* (2013.01); *D04H 1/58* (2013.01); *D04H 1/593* (2013.01); *G10K 11/162* (2013.01); *B32B 2262/0253* (2013.01); *B32B 2262/0261* (2013.01); *B32B 2262/0276* (2013.01); *B32B 2262/0284* (2013.01); *B32B 2262/062* (2013.01); *B32B 2262/065* (2013.01); *B32B 2262/08* (2013.01); *B32B 2307/102* (2013.01); *B32B 2307/3065* (2013.01); *B32B 2307/7145* (2013.01); *B32B 2307/72* (2013.01); *B32B 2605/003* (2013.01); *B32B 2605/08* (2013.01); *Y10T 442/60* (2015.04); *Y10T 442/608* (2015.04); *Y10T 442/69* (2015.04)

(56) References Cited

U.S. PATENT DOCUMENTS

| | | | |
|---|---|---|---|
| 6,376,396 B1 * | 4/2002 | Thorn et al. | 442/136 |
| 6,378,179 B1 * | 4/2002 | Hirsch | 28/103 |
| 7,514,026 B1 * | 4/2009 | Zafiroglu | 264/112 |
| 2003/0068943 A1 | 4/2003 | Fay | |
| 2004/0111817 A1 | 6/2004 | Chen et al. | |
| 2004/0176003 A1 | 9/2004 | Yang et al. | |
| 2004/0238275 A1 | 12/2004 | Keller et al. | |
| 2006/0105664 A1 | 5/2006 | Zafiroglu | |
| 2008/0050565 A1 | 2/2008 | Gross et al. | |
| 2008/0064794 A1 | 3/2008 | Murdock et al. | |

FOREIGN PATENT DOCUMENTS

| | | |
|---|---|---|
| GB | 823203 | 11/1959 |
| JP | H8-223855 | 8/1996 |
| JP | H10-280259 | 10/1998 |
| JP | 2005-036364 | 2/2005 |
| JP | 2005036364 A | 2/2005 |
| JP | 2005-076144 | 3/2005 |
| JP | 2005076144 A | 3/2005 |
| JP | 2006/193838 | 7/2006 |
| JP | 2007-512990 | 5/2007 |
| JP | 2007512990 A | 5/2007 |
| WO | 03/000976 | 1/2003 |
| WO | 03/000976 A1 | 1/2003 |
| WO | 2005/081226 A1 | 9/2005 |
| WO | WO 2006/107847 A2 * | 10/2006 |

OTHER PUBLICATIONS

Chinese Office Action dated Feb. 4, 2014; Application No. CN200980156115.7.
Chinese Second Office Action dated Jul. 10, 2013; Application No. CN200980156115.7.
European Office Action dated Oct. 15, 2013; Application No. 09829894.6.
European Office Action dated Oct. 19, 2012; Application No. 09829894.6.
Japanese Office Action dated Jul. 25, 2013; Application No. 2011-538800.
Japanese Office Action dated Apr. 11, 2014; Application No. 2011-538800.
Australian Examination Report dated Sep. 23, 2014; Appln. No. AU2009322091.
Chinese Reexamination Notice dated May 21, 2015; Application No. 200980156115.7.
Notice of Acceptance for Australian Application No. 2009322091, dated Oct. 19, 2015.
Australian Patent Application for Application No. AU 1009322091, Accepted Journal Date Oct. 29, 2015.
Acoustic Textiles-Lighter, Thinner and More Sound-Absorbent, Technical Textiles International, International Newsletters, dated Sep. 2002, pp. 15-18.
Natural Fiber Based Lightweight Sound Absorber Materials, SAE Technical Paper Series, Jeffrey S. Hurley, Buckeye Technologies Inc., dated May 2007.
Korean Office Action for Korean Application No. 1020117015473, dated Dec. 9, 2015.

* cited by examiner

NONWOVEN TEXTILE MADE FROM SHORT FIBERS

TECHNICAL FIELD

Described embodiments relate to methods of forming short fiber nonwoven textiles. Some embodiments relate to such textiles comprising short recycled fibers, which may include short thermoplastic fibers produced from waste or residual materials.

BACKGROUND

Nonwoven textiles may be formed from a variety of fibrous materials; and can vary substantially in form and density. Such materials can be used in a variety of applications, including filtration, battery separation, and sound absorption. High density, porous, nonwoven textiles can be used as a fiber board.

Nonwoven textiles can be formed into rolls or sheets. Such textiles can be converted by lamination, coating, molding, stamping, or cutting, or otherwise fabricated, into desired shapes and sizes. In certain applications, nonwoven textiles are molded into three-dimensional shapes for a variety of functional applications.

During processing of textile products, a large amount of fibrous waste can be generated. A large proportion of textile waste is generated in the form of the trimmed matrix from molded fibrous automotive components, such as insulation, carpets, trunk trim, headlinings, etc, and from cutting automotive insulation from rolls and/or sheets. In many cases, the insulation materials are laminated with films, foils, fabrics, and adhesives. Waste can represent more than 30% of the total volume of material used. Waste comprising more than one type of material, such as, fibers of different polymers, may be difficult to reprocess.

It is desirable to address or ameliorate one or more shortcomings or disadvantages associated with existing textiles or processing techniques and/or to at least provide a useful alternative thereto.

SUMMARY

Some embodiments relate to methods of forming nonwoven textiles from short fibers, comprising, at least in part, recycled fibers and containing a proportion of an adhesive component, and nonwoven materials formed according to such methods.

Alternatively, some embodiments relate to methods of forming nonwoven textiles from short fibers, wherein the methods use virgin staple fibers instead of recycled fibers. Furthermore, some embodiments relate to the nonwoven materials formed using such methods.

Certain embodiments relate to a method of forming a nonwoven material, the method comprising:
  receiving fibrous material comprising thermoplastic fibers;
  processing the fibrous material to produce short fibers;
  adding the short fibers to a preformed web; and
  heating the preformed web to form a nonwoven material. In some embodiments, the preformed web may be heated and compressed to form the nonwoven material. During heating, the thermoplastic from the fibers in the fibrous material may at least partially soften or melt and bond at least some short fibers together or to the preformed web to form the nonwoven material.

"Nowoven material" as used herein, includes composite materials that comprise nonwoven materials as well as other materials, including woven materials. Accordingly, the preformed web in some embodiments may be a woven textile, or similar material.

In some embodiments, the nonwoven material may be a thermoformable short fiber nonwoven (TSFNW) material.

Some embodiments relate to another method of forming a nonwoven material. The method comprises:
  receiving fibrous material comprising thermoplastic fibers;
  processing the fibrous material to produce short fibers;
  distributing the short fibers approximately evenly on a conveyor to provide a short fiber layer; and
  heating, and in some embodiments compressing, the short fiber layer to form a nonwoven material.

In embodiments where the short fiber layer is not compressed, a low density nonwoven acoustic material, such as a porous bulk absorber, may be produced. In embodiments where the short fiber layer is compressed, depending upon the extent of the compression, a high density nonwoven acoustic material, such as a porous limp sheet, may be produced.

Certain embodiments relate to nonwoven materials formed by the described methods. Some of these embodiments are believed to be suitable for use as sound absorption materials and relate to acoustic sheets and methods for making such sheets. Some embodiments are believed to suitable for use as filtration materials, pin boards, structural boards or separation materials.

In some embodiments, the low density nonwoven material of certain embodiments may be combined with a high density nonwoven material, which may also be in accordance with some other embodiments, to form a composite material with desirable properties. For example, some of these embodiments may provide a composite acoustic product comprising a porous limp sheet with a relatively high flow resistance, and a layer of porous bulk absorber attached to one side of the acoustic sheet and having a flow resistance substantially smaller than the sheet, wherein one or both of the porous limp sheet and the porous bulk absorber comprise short fibers and are in accordance with certain embodiments. The composite acoustic product provided by these embodiments may exhibit locally reactive acoustic behavior and an overall flow resistance desirable for acoustic products, such as between 2800 Rayls and 8000 Rayls.

The nonwoven material of certain embodiments may have a selected air flow resistivity. The selected air flow resistivity may be substantially higher than the air flow resistivity of a conventional nonwoven material comprising substantially only conventional staple fibers having a long length of, for example, from about 30 mm to about 100 mm. In some embodiments, the selected air flow resistivity achieved in a nonwoven material comprising short fibers of a certain diameter and composition may be about three times that of a conventional nonwoven material produced using longer fibers of the same diameter and composition. This increase in air flow resistivity with decreasing fiber length is unexpected based upon current acoustic theory.

Some embodiments relate to a nonwoven material comprising:
  a compressed fibrous web; and
  recycled fiber material in the fibrous web, the recycled fiber material comprising short fibers having an average length less than about 12 mm, the short fibers comprising between about 5% and less than 100% by weight of the a nonwoven material.

The recycled fiber material may comprise thermoplastic fibers. The short fibers may be obtained by milling and sifting the recycled fiber material.

Other embodiments relate to a bulk recycled fiber material comprising short fibers formed from off-cuts of material comprising thermoplastic fibers, the short fibers being formed by milling the off-cuts and having an average length of less than about 12 mm.

Certain embodiments relate to a method of forming a nonwoven material, the method comprising:
receiving fibrous material;
processing the fibrous material to produce short fibers;
distributing the short fibers across an area to form a precursor web; and
bonding together at least some of the short fibers of the precursor web to form a nonwoven material. Further embodiments relate to nonwoven materials formed in accordance with the method above.

The area across which the short fibers are distributed may comprise a surface, such as a conveyor, that does not form part of the nonwoven material, but supports the precursor web during the bonding process. Alternatively or additionally, the area may comprise a preformed web which may be sacrificial or integral with the nonwoven material. In such embodiments, the short fibers may be distributed within and/or on top of the preformed web. Accordingly, the short fibers may be used to modify the air flow resistance of the preformed web to achieve a nonwoven material having desirable properties.

The fibrous material may often include thermoplastic fibers or bicomponent fibers having an adhesive thermoplastic component. Accordingly, the bonding of at least some of the short fibers may be effected by heating the precursor web to a temperature at which the thermoplastic polymer in the short fibers will at least partially soften or melt. The softened or molten thermoplastic can be used to bond together at least some of the short fibers and form the nonwoven material. Thus, bonding includes adhering the short fibers to the softened thermoplastic so that the fibers become fused to the thermoplastic as the heated material cools.

In some embodiments, the fibrous material may comprise thermoplastic polymers having high and low melting points. In such embodiments, the fibrous material may be heated only to a temperature at which the thermoplastic polymer having a low melting point softens and melts. Thus, the thermoplastic polymer having the low melting point may be used to bond together the nonwoven material, while the thermoplastic polymer having a higher melting point remains substantially intact. In some embodiments, the low melting point thermoplastic polymer may be present in a different fiber to the higher melting point thermoplastic polymer. In some other embodiments, the high and low melting point polymers may form different components of a bicomponent fiber.

Alternatively, at least some of the short fibers may be bonded together using an adhesive component. A variety of materials may be used as the adhesive component in accordance with embodiments of the nonwoven material. The adhesive component may be a thermoplastic or thermoset resin or binder, which may be in the form of a powder. In some other embodiments, the adhesive component comprises thermoplastic fibers, such as thermoplastic staple fibers, that are combined with the short fibers prior to forming the precursor web. The adhesive component may comprise a preformed web of thermoplastic fibers onto and/or into which the short fibers are distributed to form the precursor web.

A combination of the above embodiments of the adhesive component may be used in the nonwoven material. For example, the adhesive component may comprise a thermoplastic resin powder in combination with thermoplastic fibers. Furthermore, the adhesive component may be used in combination with short thermoplastic fibers or short bicomponent fibers having an adhesive thermoplastic component formed from the fibrous material in order to bond together at least some of the short fibers of the precursor web.

The fibrous material may be processed to produce short fibers by milling the fibrous material, such as by knife milling.

BRIEF DESCRIPTION OF THE DRAWINGS

Embodiments are described in further detail below, by way of example, with reference to the accompanying drawings and/or Examples. In accompanying drawings.

DETAILED DESCRIPTION

Figure 1:
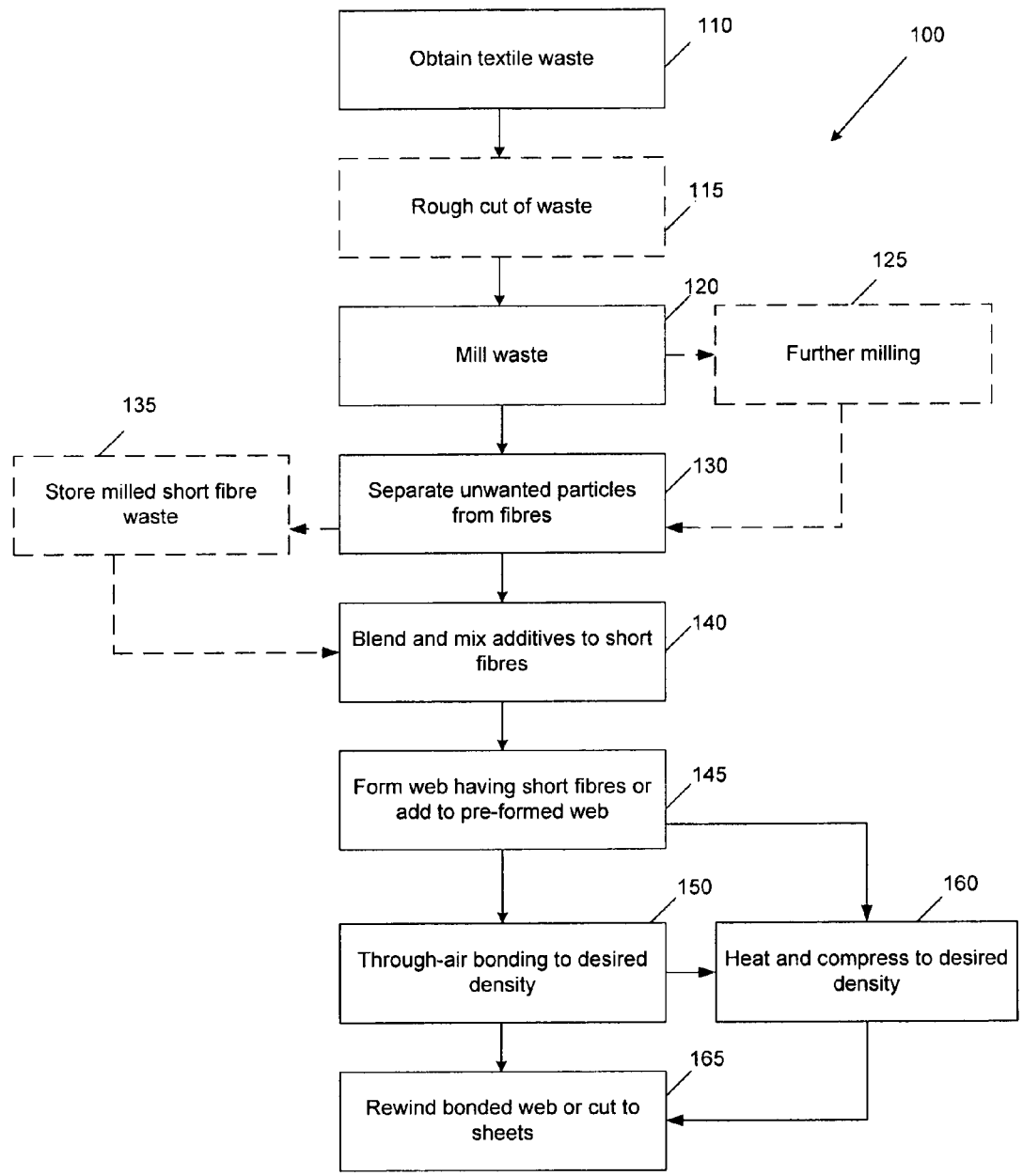
FIG. 1 is a flowchart illustrating a method of forming an acoustic sheet.

Some described embodiments relate generally to methods of forming a nonwoven material, such as a TSFNW material, comprising at least some short fibers formed largely from recycled waste material, and to the nonwoven materials formed thereby. Some embodiments relate to the bulk recycled short fiber material. Further embodiments relate generally to methods of forming a nonwoven material comprising short fibers formed from virgin staple fibers, and to the nonwoven materials formed thereby.

In the context of the present application, the term "thermoformable short fiber nonwoven" as used herein, is intended to indicate a nonwoven material that may be formed with a broad range of densities and thicknesses and that contains a thermoplastic and/or thermoset binder. The TSFNW material may be heated and thermoformed into a specifically shaped "thermoformed product".

The use of short fibers may be advantageous in thermoformable materials due to the inherent "thermal memory" of fibrous materials. During processing, fibers may be heated in order to conform them to the desired geometry for the nonwoven material. However, when the material is reheated, such as during use, the fibers may distort and revert to a geometry closer to the one they had prior to initial processing as a result of the fibers' "thermal memory". In longer fibers, such as conventional staple fibers, the overall displacement that may occur due to thermal memory distortion is larger than that of shorter fibers, as a function of the fiber's length. Accordingly, a TSFNW material may have greater temperature stability than a nonwoven material using fibers having a longer length.

TSFNW materials may require fewer binders than similar materials having longer fibers therein. In materials having longer fibers, additional binder may be needed to mitigate the effects of thermal memory distortion by constraining the fibers in the desired geometry. Thus, short fiber-based materials in accordance with some embodiments may require less binder because comparatively less thermal memory displacement occurs in shorter fibers. Accordingly, TSFNW materials in accordance with some embodiments may require less binder to achieve a desired product geometry when compared to thermoformable nonwoven materials comprising long fibers and, as such, may be more lightweight than nonwoven materials of staple fibers having a long length. In addition, thermoforming of TSFNW materials may be performed more efficiently as less material may need to be heated when compared to a nonwoven material having long staple fibers and, as a result, less energy is required to heat the material to the temperature necessary for thermoforming.

Fibrous waste material used to generate the short recycled fibers may be obtained from a wide variety of sources. The waste material may be formed by a process of creating other nonwoven products, for example as a result of conversion, stamping, etc. In some cases, particularly in the early stages of a manufacturing process, the waste material consists of only fibers. Thus, the waste may be very similar in quality to virgin staple fibers. In particular, 100% fibrous waste will be free of non-fibrous binders, such as adhesive powders, and films that may influence the character of the bulk short fiber recyclate. This material can be considered simple fibrous waste material. Alternatively, the fibrous waste material may comprise additional components, possibly because the waste is produced during later stages of a manufacturing process. As a result, the waste material may constitute a complex fibrous waste material. In some embodiments, the complex fibrous material may be post-consumer, or post-industrial, waste.

In some embodiments, the waste material may result from a conversion process, such as laminating, coating, molding, trimming, and/or cutting, or other sources of waste fabrics or fibers. Fibrous waste material may originate from a textile shearing process, such as that used to create velour, or pile, in fabrics and carpets, for example. Often this waste is considered to have very little current commercial value and is often disposed to landfill. The fibrous waste material may comprise textile wastes such as automotive carpet, or laminated fabric wastes. Short fibers may also be milled from fibers which are surplus to yarn spinning processes, or even from surplus yarn. In particular, short fibers may also be formed by milling long staple fibers, which may be either virgin or recycled fiber, or fiber that is surplus to requirements, e.g. over-production of dope dyed fiber.

Some embodiments may be particularly suited to converting materials derived from carpets into nonwoven materials. Such carpet-derived materials may include, for example, post-consumer carpet, surplus carpet stock, carpet trimmings from carpet production and waste carpet generated during laying. The carpet may be from carpet rolls or carpet tiles. The carpet waste material used in some embodiments can include the carpet backing layers, as well as the fibrous materials. The backing material may be converted into granules or particles and combined with the short fibers to enhance formation of a tortuous air flow path through the material. Alternatively, if the particulate backing material comprises a thermoplastic polymer, it can be heated as the nonwoven material is formed in accordance with some embodiments and used as a binder, for example, to create polymer-coated nonwoven materials.

The fibrous material from the carpet may comprise various fibers used in carpets, including synthetic fibers and natural fibers, such as wool, for example. In some embodiments, the production of nonwoven materials including wool, for example in the form of short fibers or a preformed web, may be advantageous as the wool can impart fire retardant properties to the material, potentially without the addition of any further fire retardant compounds.

In view of the wide range of sources of fibrous material that can be utilized in described processes, a wide range of fiber thicknesses or linear densities can be used in various embodiments. Fibers may have: a low thickness (or linear density), such as below 2 denier; a moderate thickness (or linear density), such as 2 to 12 denier; or a coarse thickness (or linear density), such as that found in carpet fibers. In general, the fiber diameter is selected based upon the desired properties of the nonwoven material produced using the short fibers. For example, the fiber diameter may be selected based upon the desired air flow resistance of the resulting material.

It has been found that fibrous waste material may be processed to produce short fibers by milling the textile waste material in a knife mill. Short recycled fibers may be produced by milling this waste in a knife mill. For example, production off-cuts or similar waste may be fed into a knife mill, or turbo rotor mill, to break up the waste and to cut the fibers down to about 1 mm to about 12 mm in length, or alternatively about 2 mm to about 8 mm in length, or alternatively about 3 to about 6 mm in length. The knife mill may be equipped with various removable screens through which the cut fibers pass. The fibers can be removed by suction through the screen. By varying the air flow and screen size, the preferred length of fiber may be obtained. Alternatively, the fibrous waste material can be substituted by virgin staple fibers to produce short virgin fibers using the same process.

The selection of the screen size will depend on the nature of the fibrous waste material or virgin staple fibers, the desired mechanical and physical properties (such as air flow properties) of the nonwoven material, and the nature of the fibers, as well as the proportion of adhesive materials that may be added. In circumstances where the fibrous waste material contains only short recycled fibers, the outcome of any screening will be quite predictable, except as noted below.

A matrix of a desired mechanical or physical property, such as air flow permeability, versus fiber size and length, and adhesive content will provide predictable results. However, where other components, such as the films etc, are present in the fibrous waste material, the material has to be characterized to determine the process conditions for a predictable outcome. Once the material is characterized, achieving the desired air flow properties will be predictable, but will be much more dependent on the screen size than where the fibrous waste material contains only short recycled fibers. In general, if the screen is too coarse, the resulting screened material may not be suitable. The effect of the use of too coarse a screen is illustrated by Example 5.

In some embodiments, the short recycled fibers will have a clearly fibrous character similar to virgin staple fibers. In other embodiments, especially if the fibrous waste material is high density and includes a high proportion of binder, the short recycled fibers may have a granular or particulate structure comprising clumped or grouped fibers or both, which may be in some way bound or adhered to each other.

For complex fibrous waste material, careful selection of the screen may be required in circumstances where the nonwoven material must have controlled air permeability, for example, in applications for acoustic materials, filters or battery separators. For applications in which the control of air flow permeability is less important, for example in a spacer layer, or a semi-structural panel, a wider range of screens may be suitable for use.

The fibrous waste materials from which the short fibers are formed may include laminated facings and backings, such as foils, films, foam layers, or fabric, as well as backings such as pressure sensitive or hot melt adhesive layers. These layers, that are normally incompatible with conventional recycling processes, are converted into small pieces in the knife milling process. These particles may then act as fillers that can assist to reduce porosity and increase tortuosity, which is desirable where a high air flow resistance is desired. If thermoplastic in nature, these small pieces can act as an adhesive for a subsequently formed fiber web.

The final form of the processed material is generally described herein for convenience as short fiber recyclate (SFR). The SFR may comprise 100% short fibers from the milling process, or possibly a lesser proportion of milled short fibers. The short fibers may optionally be blended, or otherwise combined, with suitable additives such as other forms of recycled waste, virgin (non-recycled) materials, mineral fillers, thermoset resins, colouring agents, flame retardants, longer staple fibers, etc, without limitation, to form a mixed short fiber recyclate, MSFR. Long staple fibers in the range of, for example, about 30 to 100 mm in length, alternatively about 51 mm average length, alternatively about 64 mm average length, that are relatively long compared to the milled short fibers of waste material may be added to form the MSFR. These long staple fibers may be added as a reinforcement to improve, for example, the tensile and bending strength of the nonwoven material.

In forming MSFR, suitable non-fiber waste streams may be added to act as filler or as adhesive. Additives may be added to the recycled fibers to impart desired properties, such as fire retardancy, tear resistance, improved air permeability or increased mass. Where control of physical properties is important, the waste stream should be derived from known sources, with known constituents. For convenience, within the context of this description, SFR should be interpreted as also including the mixed fiber recyclate.

At least some of the materials used to form the SFR may comprise thermoplastic materials, such as polyethylene terephthalate (PET); various co-polyester materials (Co-PET), polypropylene (PP), polyethylene (PE), polyamide (PA), ethylene vinyl acetate (EVA). The SFR may further comprise a proportion of natural fibers such as cotton, wool, hemp, etc. The proportion of natural fibers used in producing the SFR is dependent upon the desired application of the SFR nonwoven material. For example, in some embodiments a proportion of wool may be included in the SFR to impart flame retardant properties to the SFR nonwoven material, for example about 20 wt. % or more of the total mass of the SFR. In some embodiments, it may be desirable to include up to 90 wt. % of natural fibers in the SFR. The SFR nonwoven material formed using a high proportion of natural fibers may be used as a carpet underlay or pin board material, for example. The material may contain adhesive thermoplastic fibers, wherein the melting point of that fiber component is lower than the melting point of other fiber components in the waste stream.

SFR material generated from recycled waste material of thermally bonded nonwoven insulation, for example, generally includes adhesive binder fibers and higher melting point thermoplastic fibers, or natural fibers. SFR material generated from conventional textile waste, for example, generally does not include adhesive binder fibers. SFR material generated from low temperature melting fibers, such as PP, may perform the function of an adhesive binder if thermal bonding is conducted above the melting point of such fibers. Accordingly, depending on the type of waste material, it may be necessary to intimately mix the SFR with an additional thermoplastic binder to achieve desired levels of bonding. Alternatively or additionally, another adhesive component, such as a thermoset resin, may be combined with SFR during production of the nonwoven material.

In embodiments using short fibers that are not thermoplastic in character, such as wool, a thermoplastic binder may be added to the SFR or the precursor web of SFR, for example in the form of a powder or fibers. The thermoplastic fibers may also be short fibers that are optionally recycled. Higher proportions of thermoplastic binder may be added to the SFR to produce nonwoven materials having smaller pores and voids within the material. As the proportion of binder increases and the void spaces within the material reduce further, the material produced may become more like a short fiber reinforced plastic sheet than a nonwoven textile.

In some embodiments, plasticized polyvinyl chloride (PVC) or thermoplastic polyurethane (PU) may be used as the thermoplastic binder to produce a nonwoven material having PVC- or PU-coated fibers. The source of the PVC or PU may be the fibrous material used to produce the SFR. In some embodiments, the PVC or PU may be from backings or binders included with the fibrous waste. Alternatively or additionally, the PVC or PU may be added as a separate additive to the SFR.

In some embodiments, the SFR may be scattered on, or otherwise incorporated into, a preformed fibrous web, and subsequently bonded, usually through heating, to form a nonwoven material. The nonwoven material may comprise between about 5% and less than 100% by weight of recycled fibers. For example, the nonwoven material may comprise between about 5% and about 95%, 96%, 97%, 98% or 99%. Alternatively, the nonwoven material may comprise between about 20% and about 80% by weight of recycled fibers. Alternatively, it may comprise between about 30% and about 60% by weight of recycled fibers. Additives may be added to the recycled fibers before, or during, the scattering application. Additives may also be added to the SFR by the use of additional scattering units set up in series with the scattering of the SFR.

The preformed fibrous web may comprise staple fibers in the range of about 30 to 100 mm, for example, that are relatively long compared to the milled short fibers of waste material. For example, such a web may be a preformed thermally bonded web consisting of PET fibers, with a sheath/core type bicomponent binder fiber having a PET core surrounded by a lower melting point co-polyester (CoPET) sheath that melts at a lower melting point than the PET fiber. Nominally, this lower melting point may be approximately 110° C. However, other melting point CoPET polymers can also used. The bicomponent fibers may alternatively comprise other polymer types, such as PE/PET and PP/PET, PA/PET etc.

Alternatively, the SFR may be formed as a fibrous web onto a pre-manufactured nonwoven web, such as a spunbond, air-laid, melt-blown, wet-laid, spun-laced, hydro-entangled, needle-punched, or similar nonwoven web, for example, such that the SFR forms a coating on the nonwoven web. The weight and density of the preformed web can be selected based on the mechanical and physical properties required from the final sheet. For example, the web may only have sufficient tensile and tear strength so that it is suitable to act only as a carrier for the recycled short fibers. In this example, such a web may comprise a wet-laid cellulose nonwoven of between about 12 g/m$^2$ and about 50 g/m$^2$. Alternatively, the tear and tensile strength of the final nonwoven material may be largely afforded by the preformed web.

The SFR may be formed as a fibrous web onto a pre-manufactured low density nonwoven material such as, for example, a porous bulk absorber to form a composite material with variable air flow resistivity through the thickness of the material. However, following heating and compression to consolidate the SFR web, the nonwoven material including the pre-manufactured low density preformed web may be converted into a high density nonwoven material, such as, for example a porous limp sheet. The porous limp sheet formed may be utilized together with another porous bulk absorber, which may or may not be in accordance with the other embodiments described, to also form a composite product. In embodiments where the bulk absorber and the limp sheet are both TSFNW materials, the composite material may also be thermoformable. In some embodiments, the porous bulk absorber may be attached to one side of the porous limp sheet during molding and thermoforming. In another embodiment, the porous flow resistive limp sheet may be attached to one side of the limp sheet prior to molding.

In some embodiments, the SFR may be formed as a web onto a pre-manufactured woven or knitted textile web, such that the SFR forms a coating on that web. For example, the web may comprise an upholstery or decorative fabric, so that the nonwoven material so produced is aesthetically pleasing and suitable for use in an automotive or architectural interior. In this way, the nonwoven material including the SFR can form part of a composite product.

The preformed web may be sacrificial. In some embodiments, the SFR is formed onto a thin, lightweight preformed web, such as a 13 gsm tissue. Once the SFR web has been consolidated, the sacrificial preformed web may be peeled off and discarded. The sacrificial web may be removed immediately after consolidation of the SFR web. Alternatively, the sacrificial web may only be removed just prior to the use of the SFR nonwoven material.

In some embodiments, the nonwoven material may be formed with a high proportion of SFR, potentially up to 100%, without a preformed web. These embodiments may be produced by forming the SFR into a web by air laying, mechanical web forming, scattering, or otherwise distributing, the SFR onto a forming belt. The SFR may be subsequently heated and compressed.

The SFR may be heated using one or more techniques including, for example, contact heating, exposure to heated vapor (e.g. steam) or gas (e.g. such as that used in through-air bonding) and exposure to infrared radiation.

The forming belt used in some embodiments may be a solid, non-stick or non-adhesive conveyor, which is utilized to transport the material through a flat bed laminator or compression unit to produce a higher density nonwoven material. In some of these embodiments, the SFR may be blended with various additives, including other fibers such as long staple fibers. The forming belt may have an open mesh construction, and the SFR may then be passed through a through-air bonding oven to produce low density materials. The forming belt may be a solid, non-stick conveyor, for transport through a flat bed laminator or compression unit to produce a higher density nonwoven material.

In some embodiments, the nonwoven material may pass through a combination of two or more processes, and may be laminated with various facings on one or both sides. Facings may include nonwoven materials having relatively high air flow resistance, such as porous limp sheets, in accordance with certain embodiments of the nonwoven material.

A nonwoven material may be formed to have a thickness and density selected according to the required physical and air permeability properties desired of the finished nonwoven material. The density of the nonwoven material will depend, in part, on the specific gravity of any additives incorporated into the nonwoven material, as well as the proportion of the final nonwoven material that the additives constitute. Bulk density generally is a function of the specific gravity of the SFR and the porosity of the nonwoven material produced from the SFR, which can be considered to represent the packing density of the fibers in the SFR.

A low density nonwoven material may be designed to have a low density, with a finished thickness between about 1.5 mm and about 350 mm. The thickness may alternatively be between about 4 mm and about 250 mm, between about 5 mm and about 150 mm, between about 6 mm and about 75 mm, or between about 8 mm and about 50 mm. According to some of these embodiments, the nonwoven material may be formed as a relatively thick, low density nonwoven, with a bulk density of between about 10 and 200 kg/m$^3$, or between about 15 kg/m$^3$ and about 100 kg/m$^3$, or between about 20 and about 60 kg/m$^3$. The SFR nonwoven material thus formed may have a flow resistivity of between about 400 and about 200,000 Rayls/m. Alternatively, the SFR nonwoven material may have a flow resistivity between about 800 and about 150,000 Rayls/m, or between about 1,000 and about 100,000 Rayls/m. Low density nonwoven materials may have a flow resistivity of up to 275,000 Rayls/m.

In order to produce a low density nonwoven material, in some embodiments, it may be desirable not to compress the short fiber layer when heating it to produce the nonwoven material.

According to some other embodiments, the nonwoven material may be formed with a relatively high density, and exhibit a relatively high air flow resistance. Such a nonwoven material may be formed to have a thickness between about 0.1 mm and about 5 mm. The thickness may alternatively be between about 0.25 mm and about 4 mm, or between about 0.3 mm and about 3 mm, or between about 0.4 mm and about 2.5 mm. Certain applications may require thicker materials, such as for wall paneling, for example. A nonwoven material formed in such a manner may have a bulk density of between about 200 kg/m$^3$ and about 1,000 kg/m$^3$. The bulk density may be as high as 2000 kg/m$^3$. Alternatively, the bulk density may be between about 250 kg/m$^3$ and about 800 kg/m$^3$, or possibly between about 300 and about 600 kg/m$^3$.

The high density nonwoven material may be formed to have a flow resistivity of between about 275,000 Rayls/m and about 3,000,000 Rayls/m. Alternatively, the flow resistivity may be between about 1,000,000 Rayls/m and about 1,500,000 Rayls/m, or between about 1,250,000 Rayls/m and about 1,400,000 Rayls/m. For example, a 3 mm thick material may have a flow resistance of 6,000 Rayls if the air flow resistivity is 2,000,000 Rayls/m, or 3,000 Rayls at 1,000,000 Rayls/m, or 2,100 Rayls at 700,000 Rayls/m. Each of these exemplary materials may constitute a very effective acoustic material under certain circumstances, and the SFR should be selected so as to provide the correct range of the air flow resistivity.

Other embodiments relate to a nonwoven material that is formed according to the described methods and/or having the physical and material properties described herein.

Further embodiments relate to bulk recycled fiber material comprising short fibers formed from waste material comprising thermoplastic fibers. The short fibers are formed to generally have a length of about 0.5 mm to 12 mm, or about 1 mm to about 6 mm. Alternatively, the average fiber length of the short fibers may be less than about 12 mm, less than about 6 mm, or about 2 mm to about 5 mm. The short fibers may comprise a polyester material, such as a polyethylene terephthalate (PET) material, for example. The waste material may comprise an off-cut of a thermally bonded nonwoven material, for example. The short fibers may be formed by milling the off-cuts to an intermediate length and then milling them to produce the short fibers. Powder and dust particles may be removed from the milled material, if necessary, with conventional dust or powder extraction processes, for example using a cyclonic separation system. In some embodiments, the fine particles may be a desirable addition to the SFR, as they may act as filler that reduces porosity and results in a useful increase in air flow resistivity.

Embodiments of the nonwoven material, including embodiments which are a TSFNW material, as described herein, are intended to be suitable for (but not limited to) use as sound attenuation materials in vehicles, attenuating sound originating from outside a cabin of a motor vehicle and propagating toward the inside of the cabin. The nonwoven material may be used in the engine cavity of the vehicle, on the inner and outer dash panels and under the carpeting in the cabin, for example. The nonwoven material may be used as interior decorative trim, in which case it may be necessary to face the acoustic sheet with some form of decorative fabric. The acoustic sheets may be used either with an air space or in combination with other sound absorption materials, for example.

The nonwoven material may also be useful as an acoustic pin board material, or as a ceiling tile, possibly in conjunction with an additional high density, or high flow resistivity facing that acts as a porous limp sheet, or flow resistive screen, for example.

Furthermore, some embodiments of the nonwoven material as described herein are intended to be suitable for (but not limited to) use as filtration materials.

In some embodiments, wherein the nonwoven material is a low density nonwoven material, the nonwoven material may be used as a porous bulk absorber. In order to form a porous bulk absorber of the desired dimensions, once the nonwoven material is formed the nonwoven material may be vertically lapped and thermally bonded. Some other embodiments relate to high density nonwoven materials that may be used for a variety of applications, such as, for example, a porous limp sheet. The low and high density nonwoven materials may be used together to form composite materials or products.

In general, nonwoven materials used for sound absorption and for filtration must exhibit known air permeability properties. For instance, the sound absorption properties of porous materials have been well defined. Critical characteristics include air flow resistance (resistance to air flow through the material), tortuosity (the path length of a sound wave within the material), and porosity (void to volume ratio). With fibrous materials, air flow resistance is the overwhelmingly critical factor controlling sound absorption. The factors influencing filtration are essentially the same.

Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the described embodiments, air flow resistance, measured in mks Rayls, will be used to specify the air flow resistance; however other methods and units of measurement are equally valid.

For filtration purposes, the nonwoven material should have a relatively open structure that provides a low resistance to air flow, to minimize pressure drop through the material, while allowing pore sizes suitable for the capture of specific particulate sizes and quantities. Acoustic materials for sound absorption must have a relatively high air flow resistance to present acoustic impedance to the sound pressure wave incident upon the material. In both applications, air permeability should be managed to ensure predictable and consistent performance and this is achieved through management of fiber sizes, types and lengths, among other factors. For this reason, a homogeneous, short fiber nonwoven textile can be desirable. A SFR-based textile can be advantageous in terms of reducing cost and providing a significant environmental benefit by reducing or eliminating the amount of waste disposed to landfill.

The use of shorter fibers has advantages in relation to the performance of the nonwoven material. The selected air flow resistivity achieved using short fibers may be significantly higher than the air flow resistivity of a conventional nonwoven material comprising substantially only conventional staple fibers having a long length of, for example, from about 30 mm to about 100 mm. Without being limited by theory, it is believed that this unexpected increase in air flow resistance may be attained as a result of the short fibers being able to pack more efficiently in the nonwoven material than long fibers. The shorter length may reduce the degree of disorder in the packing of the fibers as they are dispersed onto a surface, such as a conveyor, or into a preformed web during production. The more ordered packing of the fibers in the material may in turn lead to an increase in the air flow resistivity. In particular, the improvement in fiber packing may achieve a reduced interstitial space in between fibers of the nonwoven material to create a labyrinthine structure that forms a tortuous path for air flow through the material, thus providing a selected air flow resistance. Accordingly, it may be possible to produce comparatively lightweight nonwoven materials without unacceptably sacrificing performance.

Furthermore, the more effective packing of the shorter fibers may allow pore size to be more readily controlled in order to achieve desirable filtration characteristics. Pore size is a key characterizing feature of filtration materials as it determines the ability of the material to filter the relevant substances for a particular application. Furthermore, pore size is one of the factors influencing the pressure drop that occurs across filter media in use.

In some embodiments, desirable levels of air permeability may be achieved by combining plural nonwoven materials of differing densities together to form a composite product. In acoustic applications, the combination of materials having low with those having high permeability can be used to achieve locally reactive acoustic behavior. In such embodiments, one or more of the nonwoven materials may be SFR-based materials in accordance with embodiments described herein.

Composite products may be formed from SFR-based porous limp sheets with relatively high flow resistances, and SFR-based porous bulk absorbers or spacer materials having flow resistances substantially smaller than the limp sheets. Methods for producing such composite products include those set out in co-owned International Application No. PCT/AU2005/000239 entitled "Thermoformable Acoustic Product" (published as WO/2005/081226), the contents of which is hereby incorporated herein by reference.

Figure 10:
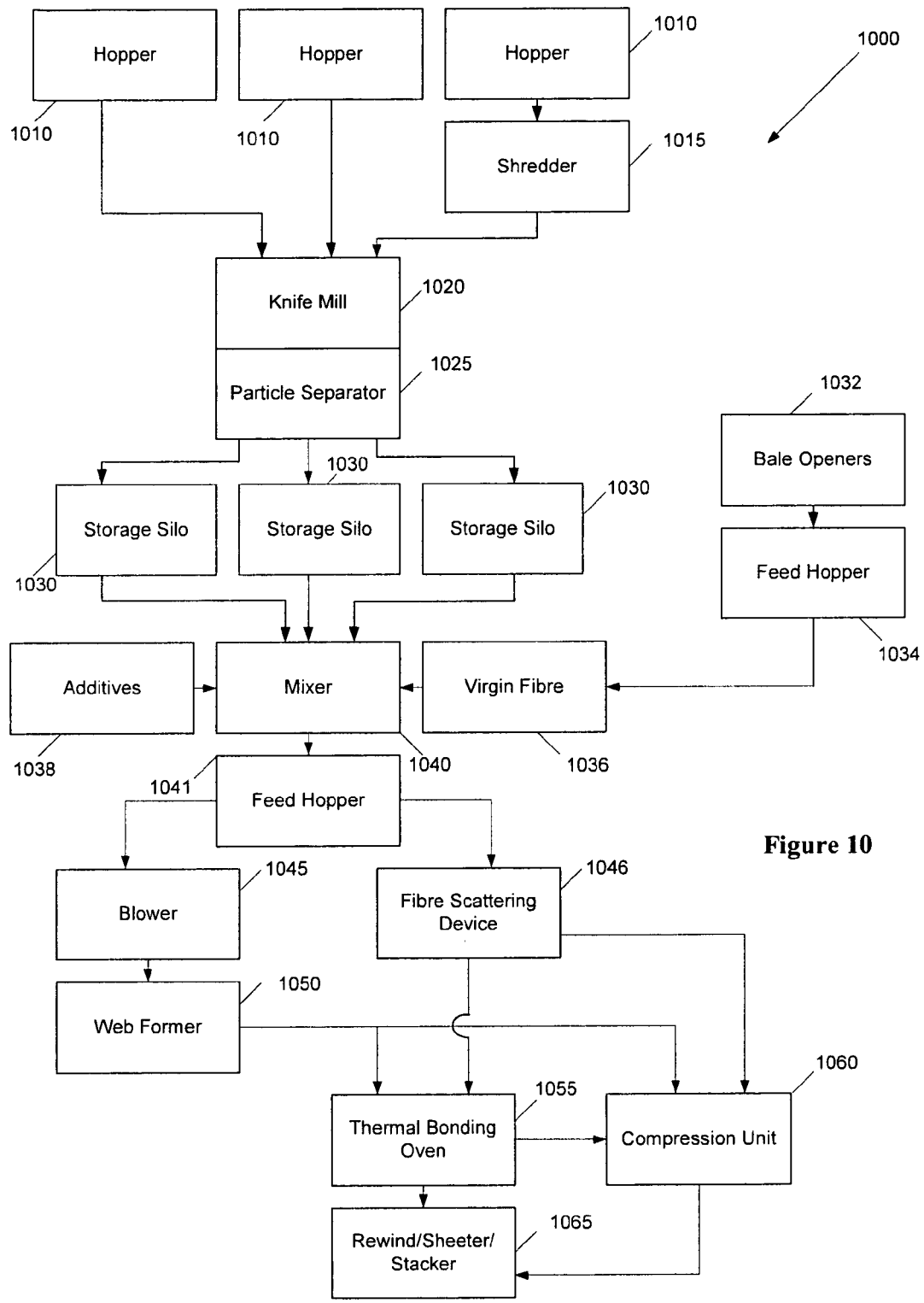
FIG. 10 is a schematic illustrating a processing system for implementing a method of forming an acoustic sheet.

Referring now to FIGS. 1 and 10, there is shown a flowchart of a method 100 of forming a nonwoven material which is a TSFNW material suitable for use as an acoustic sheet, described in combination with a schematic diagram of a processing system 1000 suitable for implementing the method. Method 100 begins at step 110, at which fibrous waste materials, such as off-cuts of fiber-containing materials including textile waste materials, are obtained. Prior to use, the fibrous waste material may be stored in one or more hoppers 1010.

The fibrous waste may, for example, comprise trimmings or off-cuts from conversion of other acoustic sheets or porous bulk absorbers that have been molded, or cut, to a specific shape to suit a particular application. Off-cuts of such materials will commonly contain proportions of high melting point thermoplastic fibers and lower melting point adhesive fibers that act as a binder. Alternatively, the waste may include natural fiber and adhesive fibers. The adhesive fibers may often comprise bicomponent CoPET/PET, PE/PET, PP/PET, PA/PET, etc, fibers. Alternatively, the SFR may comprise other suitable low melting point polymeric fibers, such as PE or PP as staple fibers or low melting point polymers as an adhesive powder. For example, polypropylene carpet fibers may be used as a source of thermoplastic adhesive fibers. As another example, the waste may include a polyethylene film laminated to one or both sides of a fiber web. The size reduction process produces a mix of polyethylene (PE) flakes and short fibers. In this example, the PE flakes may act as an adhesive binder in the TSFNW material.

As different waste materials may comprise different proportions of different fibers, a blend of fibers from different materials can be used to obtain a desired proportion of adhesive binder material among the recycled fiber material. For example, the fibrous waste materials may include bicomponent fibers, with each bicomponent fiber having a core material and a sheath material that has a lower melting point than the core, to facilitate binding of the bicomponent fibers to other fibers. For example, one kind of fibrous material may comprise, say, 50% adhesive bicomponent fibers, and another fibrous material may comprise, say, 20% adhesive bicomponent fibers. Thus, a 50/50 blend of the two fibrous waste materials will have a 35% bicomponent fiber component in the resulting SFR.

A particular advantage of the SFR is that it can be readily mixed with other waste streams or fillers, so that a relatively homogeneous blend may be obtained with the use of the minimum amount of binder required to confer suitable adhesive properties for production of the nonwoven material.

At optional step 115, some or all of the fibrous waste material may be shredded using a shredder 1015 or otherwise roughly cut down into smaller pieces. Shredding can be performed using, for example, a single shaft shredder such as the commercially available Zerma ZWS 1000 or ZWS 800 shredders.

In step 120, the waste is milled, for example using a knife mill 1020 such as is commercially available from Pallmann, of Germany as "Original Pallmann" Type PS4 knife mills, to produce intermediate to short length fibers. These intermediate length to short length fibers may have a length of, for example, 10 to 20 mm, or from 4 to 12 mm, or from 2 to 6 mm, or less. In the context of the present application, reference to fibers produced by milling is intended to refer to individual fibers or clumped, bonded or grouped fibers, or both.

To produce shorter fibers, the first stage of size reduction may be conducted more slowly, and a smaller screen may be used in the knife mill 1020, which may eliminate the need to perform any further stages of size reduction to take the fibers from an intermediate length to a short length. Alternatively, to achieve a higher production rate, intermediate short fibers may then be milled down in a second stage of size reduction through an additional section of knife mill 1020 at step 125. The two-stage knife mill 1020 may comprise a pneumatic conveying system to convey material between the first stage/section of the knife mill 1020 and the second stage/section of the knife mill 1020. Additionally, the two-stage knife mill 1020 may comprise one, two or more silos or hoppers for holding the material before or after it is cut. Three storage silos 1030 are shown in the production schematic of FIG. 10 for temporarily storing the milled fibers. Alternatively, the storage silos 1030 may be substituted by other suitable storage means, such as bags or bales. The knife mill 1020 may also comprise, at either or both stages, an automatic dust extraction system.

At step 125, the intermediate length fibers may be milled further in the second stage of the knife mill 1020 to produce shorter fibers. The short fibers produced by this second milling step may be less than about 6 mm in length, with some fibers being short enough to effectively constitute dust particles. Depending on the desired material characteristics, the dust may be extracted or retained with the rest of the short fibers. The average length of the short fibers produced by this second milling step may be between about 1 mm and about 6 mm, for example. Alternatively, the average fiber length of the short fibers may be between about 2 mm and about 5 mm. Although the milling in step 120 and optionally step 125 is used to produce the short fibers (which may include unseparated groups of fibers), fibers or particles of other lengths and/or sizes may be comprised in the recycled fiber material resulting from the milling, such as particles sufficiently small to constitute a powder or particles sufficiently large to constitute chips or flakes of composite or agglomerated fiber material.

Large particles may remain within the main chamber of the knife mill 1020 for further size reduction as they do not pass through the screen. The SFR is separated from the larger particles at step 130 by virtue of the holes in the screen and the suction applied through the screen. Thus, the short fibers (and smaller particles) are separated from the (larger particle) remainder of the milled off-cuts at step 130, for example by sifting. This step of the method may be performed using a particle separator 1025. Step 130 may also comprise extraction of dust particles from the milled waste material, for example, using a cyclonic separator and conveying the dust particles to filter bags. Step 130 may be performed concurrently with steps 120 and/or 125. The SFR extracted at step 130 may be stored in one or more storage silos 1030 or hoppers at step 135.

At step 140, additives may be added to the SFR, for example by blending or mixing, if necessary or desirable, to treat or supplement the SFR prior to web formation at step 145. Such additives may include, for example: antimicrobial substances; flame-retardant substances; thermoplastic resins; thermoset resins; mineral fillers; adhesive powders; and further staple fibers, including thermoplastic adhesive staple fibers. As illustrated in FIG. 10, additives 1038 may be combined with the SFR in a mixer 1040. If further staple fibers, such as virgin fibers 1036, are added, the processing system 1000 may further comprise bale openers 1032 for opening the bales of bulk staple fibers and placing them in a feed hopper 1034. The virgin fibers 1036 are then fed into the mixer 1040. At step 145 the SFR, together with any additives, is formed into a web, for example by scattering, mechanical forming, or air laid processes.

Scattering may be performed by a fiber scattering device 1046 comprising a needle covered roller disposed above a forming belt and fed from the mixer 1040 by a feed hopper 1041 in which the SFR is contained. The SFR is scattered so as to achieve a roughly uniform distribution of the short fibers. A suitable device for scattering the recycled fiber material is commercially available from Techno Partners, of Germany. A second or third scattering unit may be employed subsequent to the fiber scattering, to add various fillers or adhesive powders onto the surface of the web.

In some embodiments, the SFR can be formed into a web through an air laid process using a web former 1050, such as is available from Formfiber (of Denmark) or Oerlikon (of Austria) onto a porous (mesh) conveyor, sometimes known as a forming belt. The SFR is transferred onto the web former 1050 in an air stream provided using a blower 1045. Suction is applied through the conveyor to consolidate the web prior to thermal bonding. A disadvantage of an air-laid web is that the fine particles, such as dust, and any desired fillers, can tend to form a layered, rather than a homogeneous construction, resulting in a variation in web density through the depth of the material. Another disadvantage of this process is that very fine fiber particles may be drawn through the mesh, rather than retained within the fiber matrix where they may enhance air flow resistivity characteristics. In some embodiments, this effect can be mitigated by using only an air blower and not applying any suction during the air laying process, thereby arriving at a relatively natural distribution of particulates in forming the matrix. It may also be useful to form the nonwoven material using a preformed web, which can act as a filter or holding layer to retain the fine particles. The use of a preformed web may also keep fine short fibers in place during the air laying process so that they are not blown away by the blower 1045.

Further embodiments may involve forming a web of SFR by a mechanical web forming process, such as the Bemaformer process available from Bettarini and Serafini, of Italy. An advantage of the mechanically formed web is that fine particles, dust, and any desired fillers, can be incorporated into the SFR mixture prior to web formation and are retained within the fiber matrix, resulting in a more homogeneous fiber composite.

Following web formation at step 145, depending upon the intended application of the web, the web may be consolidated. In some embodiments where a low density nonwoven is desired, the web is consolidated by through-air bonding at step 150 using a thermal bonding oven 1055. Through-air bonding generally provides a good standard of heating, but a minor amount of compression may also be provided, for example by the belts in the thermal bonding oven 1055, sufficient to achieve consolidation of the nonwoven material while also ensuring that the material has a low density. As an alternative to through-air bonding, steam or infrared radiation may be used to provide the heating required to achieve bonding. In some embodiments, a combination of heating techniques may be used.

In embodiments where a high density nonwoven is desired, the web may be consolidated and densified by heating and compressing the web at step 160 in a compression unit 1060. This may be achieved, for example, by mechanical compression including passing it through a roller, such as a heavy roller or a nip roller. The compression unit may use double belt lamination compression and, as such, may be a flat bed laminator. In some embodiments, each belt may be acted upon by rollers at the region of the belt in contact with the web to control the extent of any compression applied.

The SFR web may be heated or cooled using contact heating or cooling members. In some embodiments, the contact heating/cooling members are located along the length of the belt in contact with the web, for example the belt of a flat bed laminator. At step 160, the SFR web, incorporating short fibers, is heated to bond the material to form a stable, manageable web with suitable mechanical properties. Thus, method 100 is capable of producing a TSFNW of variable density and thickness, depending on process settings. The density of the final TSFNW is controlled by the degree of compression.

A low density TSFNW will have a relatively low air flow resistance. As the density of the nonwoven material increases, the air flow resistance increases. The air flow resistivity of the material will generally remain constant. However, for higher density materials, air flow resistivity may increase due to adhesive binder flowing and filling voids and interstitial spaces within the fiber structure of the nonwoven material.

As discussed above, a relatively low density TSFNW may be bonded using a through-air bonding process. To achieve a specific thickness, it may be necessary to calibrate the thickness in-line, which may be achieved using a thermal bonding oven 1055 comprising a double belt through-air bonding oven. Alternatively, the hot web may be calibrated by a certain amount of mechanical compression at the exit of the thermal bonding oven 1055.

A low density sheet may also be formed using a compression unit 1060 comprising a double-belt lamination/compression line, such as is available from TPS of Germany. However, the achievable thickness of the acoustic sheet is limited by the penetration of heat into the core of the SFR layer.

A high density TSFNW may alternatively be formed by calendaring a low density sheet through a compression unit 1060 subsequent to through-air bonding. The hot web may be calendared to a pre-determined thickness and density at the outlet of the thermal bonding oven 1055 by appropriate adjustment of the calendar roll settings of the compression unit 1060.

A high density sheet may be formed by passing the web of short fiber recyclate through a double belt lamination/compression line (as compression unit 1060), such as is available from Schaetti of Switzerland, or from TPS of Germany.

In some embodiments, the short fibers may be formed by a suitable process for forming a web of short fibers, such as those previously described, to form a relatively evenly distributed mass of short fiber recyclate. For example, the short fiber recyclate may be distributed evenly on a solid or mesh polytetraflouroethylene (PTFE) coated conveyor belt to produce a TSFNW material manufactured from up to 100% SFR.

In some embodiments, the short fibers are formed onto a preformed fibrous web which contains relatively long and medium length fibers, for example in the order of 30 mm in length to 100 mm in length, and may comprise a proportion of bicomponent fibers. Because the SFR may be selected to comprise an approximately known proportion of thermoplastic fibers, the preformed ("carrier") web need not have as high a proportion of bicomponent fibers as would be necessary without the addition of the thermoplastic fibers to the SFR obtained from the off-cuts. Reduction of the amount of bicomponent fibers in the carrier web can decrease the cost of manufacture of the carrier web.

In other embodiments, the SFR may be applied onto a preformed web of nonwoven, knitted, or woven textile, this textile acting primarily as a support to carry the SFR web through the bonding processes, and potentially as a decorative surface layer.

Depending on the material composition of the preformed web and the amount of SFR added to the web, the SFR may comprise between about 5% and about 99% by weight of the TSFNW. Alternatively, the SFR may comprise between about 10% and about 80%, or between about 20% and about 60% by weight, or alternatively, the recycled fiber material may comprise between about 30% and about 40% by weight of the TSFNW.

The bonding of the SFR web incorporating short fibers may be performed at a temperature between about 100 and about 220° C. The specific temperature at which the preformed web and recycled fiber material is to be heated may vary, depending on the specific kinds of thermoplastic fibers in the off-cut material and in the preformed web, or other thermoplastic adhesive binder added at step 140.

Following densification of the web at steps 150 to 160 (as appropriate), the bonded and densified web is wound into rolls or cut into sheets by a rewind mechanism or sheeter/stacker 1065 at step 165 for later use in a desired application.

EXAMPLES

The following examples are provided to illustrate the invention, and are not to be construed in any way as limitations thereon. All modifications, changes, and adaptations of the invention are intended to be within the meaning and range of equivalents of the appended claims.

In the following examples, samples of SFR were prepared from a selection of mixed cutting fibrous waste material. The fibrous waste material was processed through a first stage of size reduction in an "Original Pallmann" Type PS4 Pallmann knife mill fitted with a 12 mm screen. It was then passed through a second stage of size reduction through another "Original Pallmann" Type PS4 Pallmann knife mill fitted with a second smaller screen as discussed in the specific examples. The milled waste produced a range of particle sizes at and below the mesh size of the sieve.

The fibrous waste material was then scattered onto a solid forming belt using a TPS fiber scattering unit equipped with Rotary Brush System. The material was bonded and compressed using a TPS Thermofix® type 24 TL 4/40 2/40 57 SGT SGB 2NR 1SR high compression laminator to create samples with a different bulk density. The density of the samples was varied using one of two methods. First, the density may be varied by manufacturing samples at the same thickness and varying the amount of SFR that is scattered onto the forming belt. Alternatively, the density may be varied by scattering around the same amount of SFR onto the belt, but varying the degree of compression to produce samples at different thicknesses.

The final thickness of the nonwoven material is, in part, dependent upon the machine gap used. The compression rollers are set to a particular machine gap, as specified in the Examples below. However, the rollers are spring loaded to allow the SFR layer to enter the machine. Accordingly, if a relatively large amount of SFR is scattered onto the forming belt, the final nonwoven product may be thicker than the machine gap.

Nip press rollers were used to apply pressure to some samples during production. Each of the two nip rollers could be independently engaged to apply pressure to the sample. For the majority of the samples produced, only one nip roller was used to apply a pressure of about 3 bar (300 kPa) to the sample. However, for Sample 3B of Example 3, both nip rollers were used, with each roller applying a pressure of about 6 bar (600 kPa).

The air flow resistivity of samples produced was measured in accordance with ASTM C522-87.

Example 1

Recyclate type C1 was a substantially open SFR prepared from cutting fibrous material waste comprising the components in approximate proportions as shown in Table 1. Samples were prepared as discussed above and characterized. During preparation of the SFR, material was passed through a 6 mm secondary screen.

TABLE 1

| Components | % |
|---|---|
| 12 denier spirally crimped hollowed polyester staple fiber | 24 |
| 2 denier CoPET/PET bicomponent polyester adhesive fiber | 8 |
| 3 denier PE/PET bicomponent adhesive fiber | 16 |
| 3 denier regenerated polyester staple fiber | 32 |
| 14 micron LDPE film | <1 |
| 100 micron LDPE film | 20 |

The processing parameters used to produce the samples are shown in Table 2.

TABLE 2

| Sample Number | Machine Speed, m/min | Machine Temperature, °C. | Machine Gap, mm | Nip Press | Percentage of Recyclate |
|---|---|---|---|---|---|
| 1C | 2 | 210 | 2 | no nip | 100 |
| 1B | 2 | 190 | 2 | 1 × 3 bar | 100 |
| 1A | 2 | 190 | 2 | 1 × 3 bar | 100 |
| 1D | 2 | 210 | 2 | 1 × 3 bar | 100 |
| 1E | 2 | 210 | 2 | 1 × 3 bar | 100 |

Figure 2:
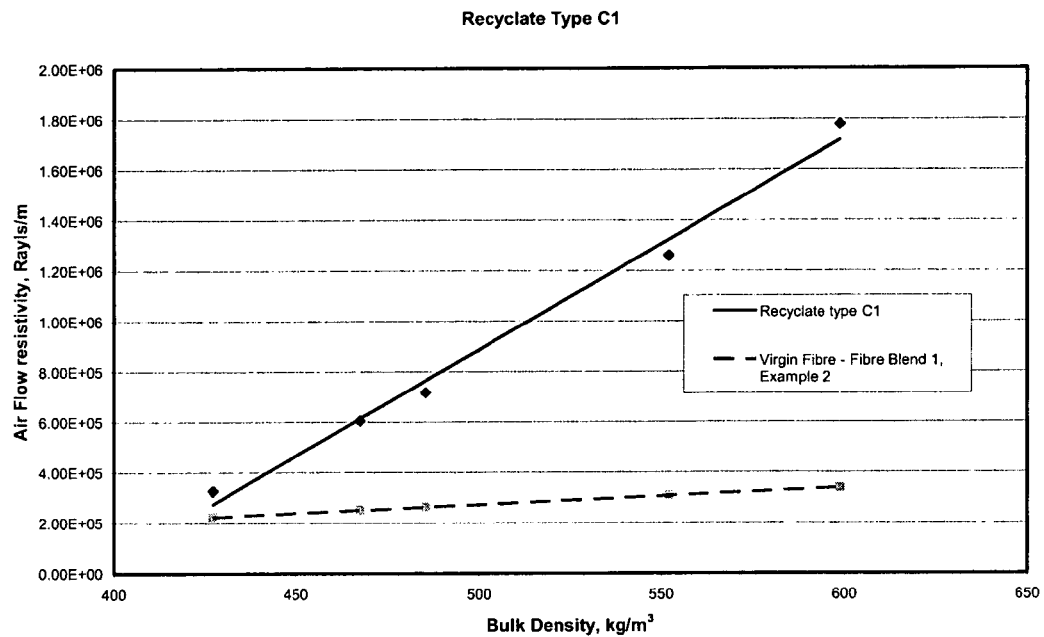
FIG. 2 is a graph of air flow resistivity (Rayls/m) vs. bulk density ($kg/m^3$) for the samples from Examples 1 and 2.

The measured data is shown in Table 3 and illustrated in FIG. 2.

TABLE 3

| Sample Number | Surface Density, g/m² | Average Thicness, m | Bulk Density, kg/m³ | Average Flow Resistance, Rayls | Average Flow Resistivity, Rayls/m |
|---|---|---|---|---|---|
| 1C | 817 | 0.00191 | 427 | 627 | 3.28.E+05 |
| 1B | 664 | 0.00142 | 468 | 860 | 6.06.E+05 |
| 1A | 760 | 0.00157 | 486 | 2246 | 7.18.E+05 |
| 1D | 512 | 0.00093 | 552 | 1889 | 1.26.E+06 |
| 1E | 1346 | 0.00225 | 599 | 4000 | 1.78.E+06 |

FIG. 2 illustrates that there is a roughly linear relationship between air flow resistivity and bulk density, indicating the high degree of homogeneity of the type C1 recyclate, and of the fibrous web subsequently produced by the method described.

The linear relationship also demonstrates that, despite the presence of the milled LDPE film, the air flow resistance and the air permeability are relatively predictable and consistent.

For ease of interpretation, the results for Example 2 are superimposed on the results for Example 1 in FIG. 2.

Example 2

Example 2 illustrates the computed relationship between air flow resistivity of a nonwoven fiber material. The nonwoven material samples were produced from the same blend of conventional staple fibers from which the recyclate material for Example 1 was produced. The approximate composition of the fiber blend, denoted as Fiber Blend 1, is shown in Table 4 below.

TABLE 4

| Components of Fiber Blend 1 | % |
|---|---|
| 12 denier spirally crimped hollow polyester staple fiber | 30 |
| 2 denier CoPET/PET bicomponent polyester adhesive fiber | 10 |
| 3 denier PE/PET bicomponent adhesive fiber | 20 |
| 3 denier regenerated polyester staple fiber | 40 |

The average fiber size of the unlaminated thermally bonded nonwoven was about 5.4 D. The nonwoven material was compressed during production to produce samples with a range of bulk densities.

Figure 3:
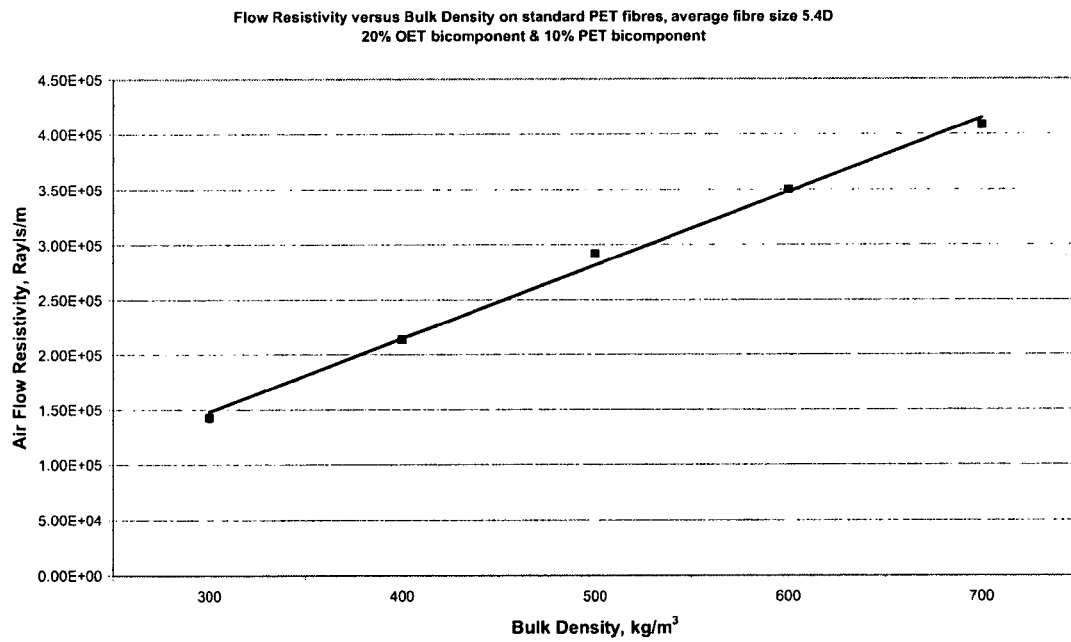
FIG. 3 is a graph of air flow resistivity (Rayls/m) vs. bulk density ($kg/m^3$) for the samples from Example 2.

The results are computed from the following empirical model:

$$R = 2.8 \times 10^{-2} \cdot \rho \cdot (10 \cdot H)^{(0.4 \cdot (H/0.02-1))} \cdot d^{-1} \cdot l^{-1}$$

where:
R—flow resistance, MKS Rayls
ρ—product surface density, kg/m²
d—fiber dimension, denier (D)
l—length of fiber, meters
H—product thickness, meters The computed data is shown in Table 5 and graphed in FIG. 3.

TABLE 5

| Sample Number | Fiber Blend | Surface Density, g/m² | Average Thickness, m | Bulk Density, kg/m³ | Average Flow Resistance, Rayls | Average Flow Resistivity, Rayls/m |
|---|---|---|---|---|---|---|
| 1 | 1 | 190 | 0.0006 | 317 | 86 | 1.43E+05 |
| 2 | 1 | 240 | 0.0006 | 400 | 128 | 2.14E+05 |
| 3 | 1 | 280 | 0.00057 | 491 | 166 | 2.92E+05 |
| 4 | 1 | 350 | 0.00061 | 574 | 214 | 3.50E+05 |
| 5 | 1 | 480 | 0.0007 | 686 | 286 | 4.09E+05 |

In this instance, the flow resistivity is computed for conventional staple fibers of 51 to 64 mm staple length. The difference in gradient between both lines is directly proportional to increase in flow resistivity at the same bulk density for the SFR.

Comparing the results for Examples 1 and 2, the computed air flow resistivity for the basic fiber blend is almost 3 times lower, at a similar bulk density, than that of the SFR used to produce recyclate type C1.

Conversely, the air permeability of the TSFNW material is substantially less than for a staple fiber web of the same fiber blend produced by conventional processes, at similar bulk density. This increase in flow resistivity results from both the presence of the flakes of LDPE film incorporated into the SFR, in combination with the increased packing density of the short fibers.

Example 3

Recyclate type C3 contains fiber, a laminated aluminium/spunbond laminate and a pressure sensitive adhesive coating on release paper, in approximate proportions as detailed in Table 6. SFR was prepared as discussed above, during which it was passed through a 2 mm secondary screen.

TABLE 6

| Components | % |
|---|---|
| 12 denier spirally crimped hollow polyester staple fiber | 15.5 |
| 2 denier CoPET/PET bicomponent polyester adhesive fiber | 25.5 |
| 3 denier regenerated polyester staple fiber | 44 |
| 6.35 micron aluminium foil | 1 |
| 50 g/m² polyester spunbond | 3 |
| Acrylic pressure sensitive adhesive | 4 |
| Silicon coated, PE coated release paper | 7 |

Samples were prepared as discussed above and characterized. The approximate processing parameters used to produce the samples are shown in Table 7.

TABLE 7

| Sample Number | Machine Speed, m/min | Machine Temperature, °C. | Machine Gap, mm | Nip Press | Percentage of Recyclate |
|---|---|---|---|---|---|
| 3C | 2 | 210 | 2 | 1 × 3 bar | 100 |
| 3D | 6 | 210 | 2 | 1 × 3 bar | 100 |
| 3A | 2 | 210 | 2 | 1 × 3 bar | 100 |
| 3E | 10 | 210 | 2 | 1 × 3 bar | 100 |
| 3F | 10 | 210 | 2 | 1 × 3 bar | 100 |
| 3B | 2 | 210 | 2 | 2 × 6 bar | 100 |

Figure 4:
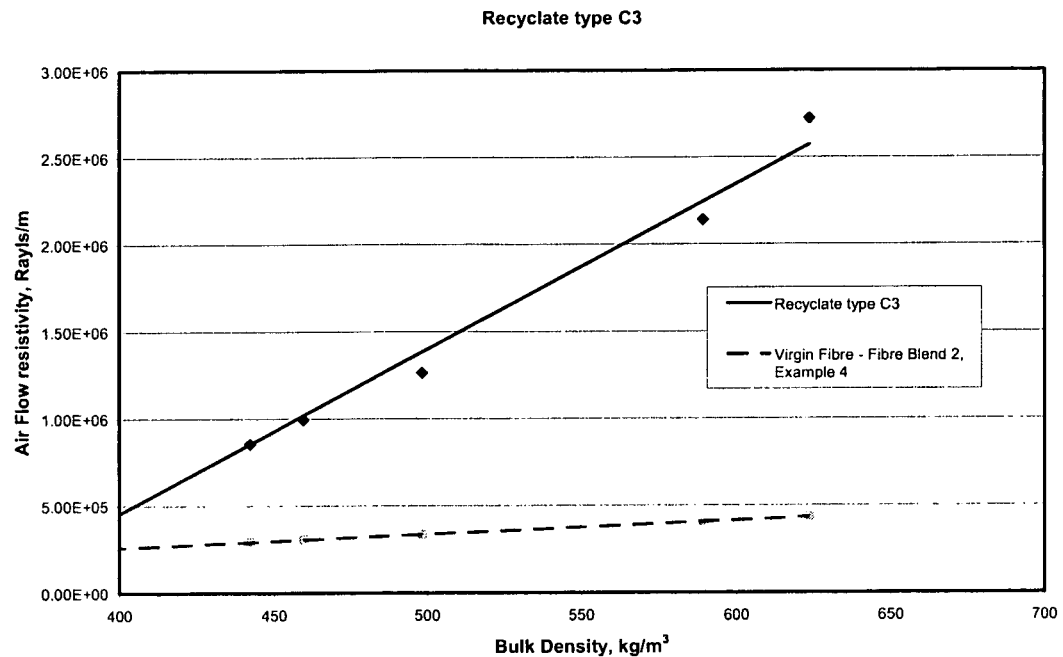
FIG. 4 is a graph of air flow resistivity (Rayls/m) vs. bulk density ($kg/m^3$) for the samples from Examples 3 and 4.

The measured data is shown in Table 8 and graphed in FIG. 4.

TABLE 8

| Sample Number | Surface Density, g/m² | Average Thickness, m | Bulk Density, kg/m³ | Average Flow Resistance, Rayls | Average Flow Resistivity, Rayls/m |
|---|---|---|---|---|---|
| 3C | 529 | 0.00134 | 396 | 683 | 5.11.E+05 |
| 3D | 493 | 0.00112 | 442 | 1067 | 8.56.E+05 |
| 3A | 1102 | 0.00240 | 460 | 2867 | 9.95.E+05 |
| 3E | 578 | 0.00116 | 498 | 1467 | 1.26.E+06 |
| 3F | 1046 | 0.00178 | 589 | 3800 | 2.14.E+06 |
| 3B | 1115 | 0.00179 | 624 | 4867 | 2.72.E+06 |

As in Example 1, FIG. 4 illustrates that the substantially open SFR prepared from the cutting fibrous waste material displays a roughly linear relationship between air flow resistivity and bulk density, thus indicating a high degree of homogeneity for the type C3 recyclate, and of the TSFNW material subsequently produced by the method described.

The linear relationship also demonstrates that the air flow resistance and the air permeability are relatively predictable and consistent, despite the presence of the milled laminated facings and adhesive backing materials.

For ease of interpretation, the results for Example 4 are superimposed on the results for Example 3 in FIG. 4.

Example 4

The average fiber size of the unlaminated thermally bonded nonwoven used was about 5.4 D and the fiber blend, denoted as Fiber Blend 2, comprises the same blend of conventional staple fibers as that used to produce Recyclate C3 in Example 3. The composition of Fiber Blend 2 is shown in approximate proportions in Table 9 below.

TABLE 9

| Components of Fiber Blend 2 | % |
|---|---|
| 12 denier spirally crimped hollow polyester staple fiber | 20 |
| 2 denier CoPET/PET bicomponent polyester adhesive fiber | 30 |
| 3 denier regenerated polyester staple fiber | 50 |

Figure 5:
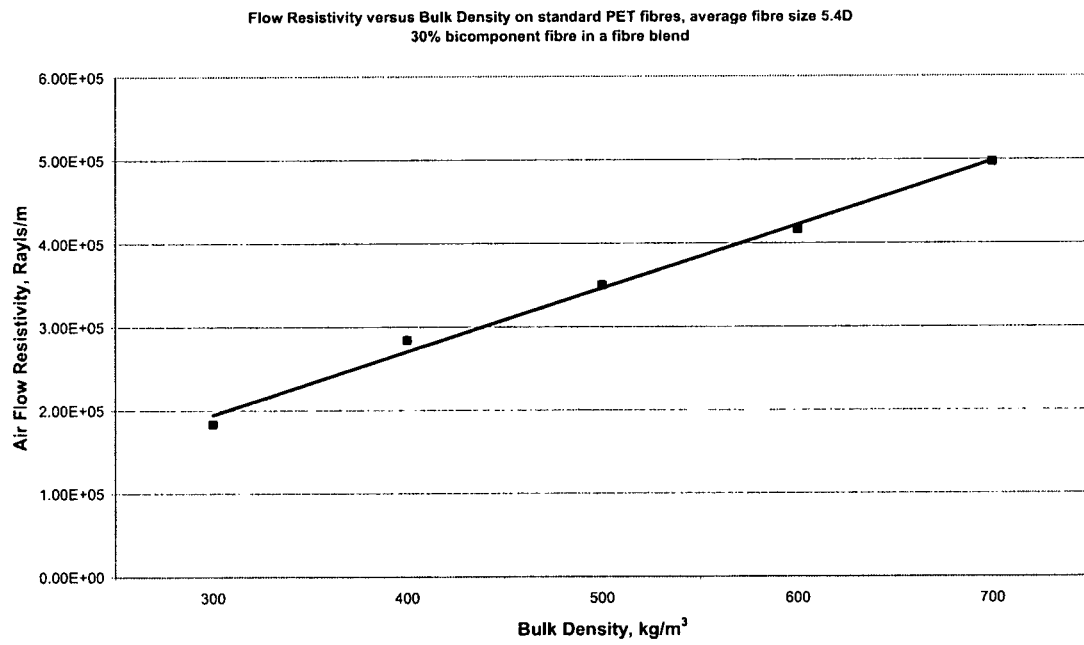
FIG. 5 is a graph of air flow resistivity (Rayls/m) vs. bulk density ($kg/m^3$) for the samples from Example 4.

FIG. 5 indicates the air flow resistivity of the nonwoven material when compressed to a range of bulk densities. Once again, this was computed using the previous empirical model.

The computed data is shown in Table 10 and graphically displayed in FIG. 5.

TABLE 10

| Sample Number | Fiber Blend | Surface Density, g/m² | Average Thickness, m | Bulk Density, kg/m³ | Average Flow Resistance, Rayls | Average Flow Resistivity, Rayls/m |
|---|---|---|---|---|---|---|
| 1 | 2 | 250 | 0.0008 | 313 | 147 | 1.84E+05 |
| 2 | 2 | 240 | 0.0006 | 400 | 170 | 2.84E+05 |
| 3 | 2 | 320 | 0.00065 | 492 | 228 | 3.50E+05 |
| 4 | 2 | 500 | 0.00085 | 588 | 354 | 4.17E+05 |
| 5 | 2 | 800 | 0.0011 | 121 | 547 | 4.97E+05 |

Comparing the results for Examples 3 and 4, the computed air flow resistivity for the basic fiber blend is almost 3 times lower, at a similar bulk density, than that of the SFR used to produce recyclate type C3. The air permeability of the TSFNW web is substantially less than for a staple fiber web of the same fiber blend produced by conventional processes, at similar bulk density.

Example 5

Recyclate type C2 was identical in all respects to recyclate type C3, with the exception that it was screened in a 6 mm secondary screen rather than a 2 mm secondary screen. The components of C2 are shown in approximate proportions below in Table 11.

TABLE 11

| Components | % |
|---|---|
| 12 denier spirally crimped hollow polyester staple fiber | 15.5 |
| 2 denier CoPET/PET bicomponent polyester adhesive fiber | 25.5 |
| 3 denier regenerated polyester staple fiber | 44 |
| 6.35 micron aluminium foil | 1 |
| 50 g/m² polyester spunbond | 3 |
| Acrylic pressure sensitive adhesive | 4 |
| silicon coated, PE coated release paper | 7 |

The processing parameters used to produce the samples are shown in Table 12.

TABLE 12

| Sample Number | Machine Speed, m/min | Machine Temperature, °C. | Machine Gap, mm | Nip Press | Percentage of Recyclate |
|---|---|---|---|---|---|
| 2A | 2 | 210 | 10 | 1 × 3 bar | 100 |
| 2B | 2 | 210 | 5 | 1 × 3 bar | 100 |
| 2C | 2 | 210 | 5 | 1 × 3 bar | 100 |
| 2D | 2 | 210 | 2 | 1 × 3 bar | 100 |
| 2E | 2 | 210 | 2 | 1 × 3 bar | 100 |

Figure 6:
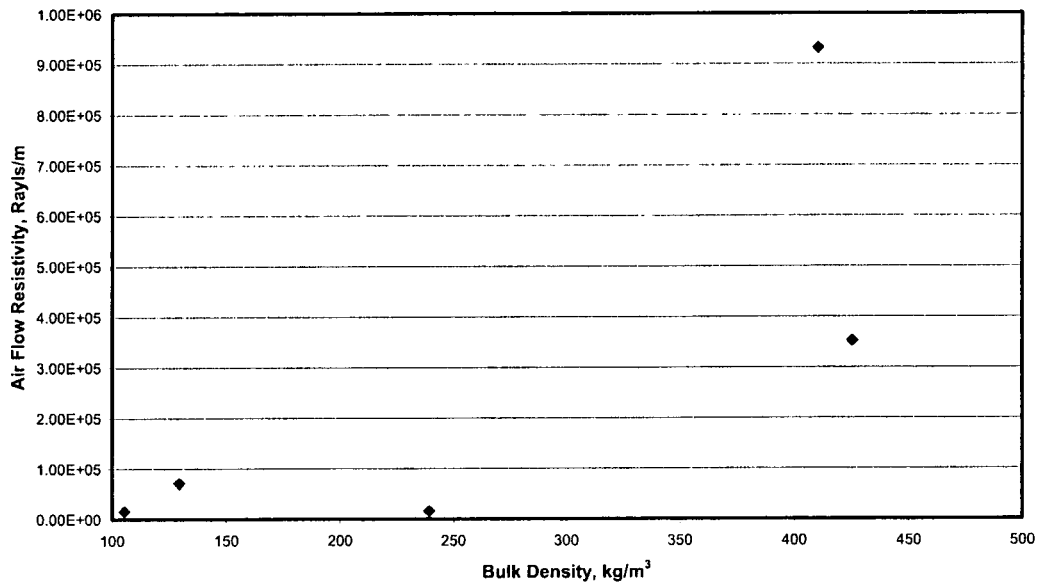
FIG. 6 is a graph of air flow resistivity (Rayls/m) vs. bulk density ($kg/m^3$) for the samples from Example 5.

The measured data is listed in Table 13 and shown graphically in FIG. 6.

TABLE 13

| Sample Number | Surface Density, g/m² | Average Thickness, m | Bulk Density, kg/m³ | Average Flow Resistance, Rayls | Average Flow Resistivity, Rayls/m |
|---|---|---|---|---|---|
| 2A | 1115 | 0.00272 | 410 | 2533 | 9.32.E+05 |
| 2B | 723 | 0.00170 | 425 | 600 | 3.53.E+05 |
| 2C | 1493 | 0.00624 | 239 | 100 | 1.60.E+04 |
| 2D | 541 | 0.00418 | 130 | 300 | 7.19.E+04 |
| 2E | 1609 | 0.01525 | 106 | 240 | 1.57.E+04 |

The measured air flow resistivity is illustrated by FIG. 6, which shows a broad scatter of results, indicating that the material is inconsistent and non-ideal for producing a homogeneous TSFNW.

Comparing this example, with Examples 1 and 3, it is apparent that the milling process must provide a consistent particle size of SFR, especially when the materials are quite disparate, as in this example. To achieve this outcome, it may be necessary to screen the waste material to a smaller particle size.

Comparing Example 3 with Example 5, it is evident that the 2 mm screen produces sufficiently small particles of milled foil, spunbond, adhesive, and release paper, so that they have no significant negative influence on the predictability of the air flow resistivity or the air permeability.

Examples 3 and 5 illustrate a method that may be suitable for evaluating the quality of short fibers produced in certain embodiments. Samples of the short fibers produced under certain conditions may be manufactured into nonwoven samples across a range of bulk densities. The air flow resistivity may then be measured and plotted against the bulk density. When the quality of the short fibers is consistent and, accordingly, suitable for use in the production of nonwoven materials, the relationship between bulk density and air flow resistivity should be relatively linear. Such a relationship is displayed in FIG. 4, with reference to Example 3. In contrast, as in the case of Example 5, if the short fibers produced are not consistent a clear relationship between bulk density and air flow resistivity will not be displayed, see for example FIG. 6. Thus, further processing of the fibers may be required.

Example 6

Sample 7 is a high bulk density thermoformable acoustic sheet comprising the following components (in approximate proportions):

| Components | |
|---|---|
| 4 Denier CoPET/PET bicomponent adhesive polyester fiber, melting point 160° C. | 70% |
| 3 Denier regenerated polyester fiber. | 30% |

The bicomponent fiber, in this instance, was a highly crystalline fiber, with a melting point of about 160° C. The fiber blend used is denoted as Fiber Blend 3.

Sample 7 was manufactured by passing a preheated 25-30 mm thick vertically lapped product through a laminator. The laminator speed was about 3 m/min and the top and bottom belts were at about 200° C. The machine gap used was 1 mm, which resulted in a production with final thickness of about 1.5 mm.

Sample numbers 4A and 4B were produced using SFR produced from Sample 7. The SFR and Samples 4A and 4B were produced as discussed above. The fibrous waste material from Sample 7 was processed into SFR according to the method discussed above, during which it was passed through a 2 mm secondary screen to produce the SFR type A.

The approximate processing parameters used to produce the recyclate samples are shown in Table 14.

TABLE 14

| Sample Number | Machine Speed, m/min | Machine Temperature, °C. | Machine Gap, mm | Nip Press | Percentage of Recyclate |
|---|---|---|---|---|---|
| 4A | 2 | 210 | 1 | 1 × 3 bar | 100 |
| 4B | 2 | 210 | 1 | 1 × 3 bar | 100 |

The measured air flow resistivity is shown in Table 15.

TABLE 15

| Sample Number | Recyclate Type | Surface Density, g/m² | Average Thickness, m | Bulk Density, kg/m³ | Average Flow Resistance, Rayls | Average Flow Resistivity, Rayls/m |
|---|---|---|---|---|---|---|
| 4A | A | 1537 | 0.00327 | 470 | 1600 | 4.89.E+05 |
| 4B | A | 702 | 0.00135 | 526 | 650 | 4.87.E+05 |
| 7 | 3 | 700 | 0.0015 | 466 | 720 | 6.66.E+05 |

Whereas all the other recycled examples produced a substantially open SFR with a range of particle sizes, the recyclate in this instance was more granular and regular in size and shape. In this instance, the fibers were essentially unopened. Samples 4A and 4B produced a TSFNW with very similar air flow resistivity to that of the original product, Sample 7, and moreover they also display a similar bulk density to that of Sample 7.

In this instance, the bulk density of Samples 4A and 4B could not be increased significantly beyond that of Sample 7, indicating that the original "packing density" of individual fibers cannot be substantially increased any further.

Based on the behavior of recyclates C1 and C3, it is apparent that the presence of a wide range of particle sizes, along with substantial opening of the waste fibers, makes it possible to achieve a significantly higher air flow resistivity. Homogeneously mixing recyclate A with substantially opened short staple fiber would increase the air flow resistivity.

By controlled selection of the recycling materials, screen size in the milling process, and the additives, such as additional staple fibers, that might be included it is therefore possible to achieve a selected air flow resistivity for a SFR produced from a wide variety of waste streams.

Example 7

This example provides calculated sound absorption and sound transmission loss for a flow resistive sheet (sometimes known as a porous limp sheet). The density has been selected to vary between 300 gsm and 2000 g/m², by maintaining the machine gap and varying the amount of SFR deposited. The flow resistance of the resulting samples varies between 430Rayls up to 8600Rayls. Layers with flow resistances of 430, 860, 2150, 4300 and 8600 Rayls were modeled using the formula described above in Example 2.

This example describes the acoustic behavior that can be expected of a high bulk density sheet made of 100% Recyclate C2 SFR, in accordance with embodiments described.

Figure 7:
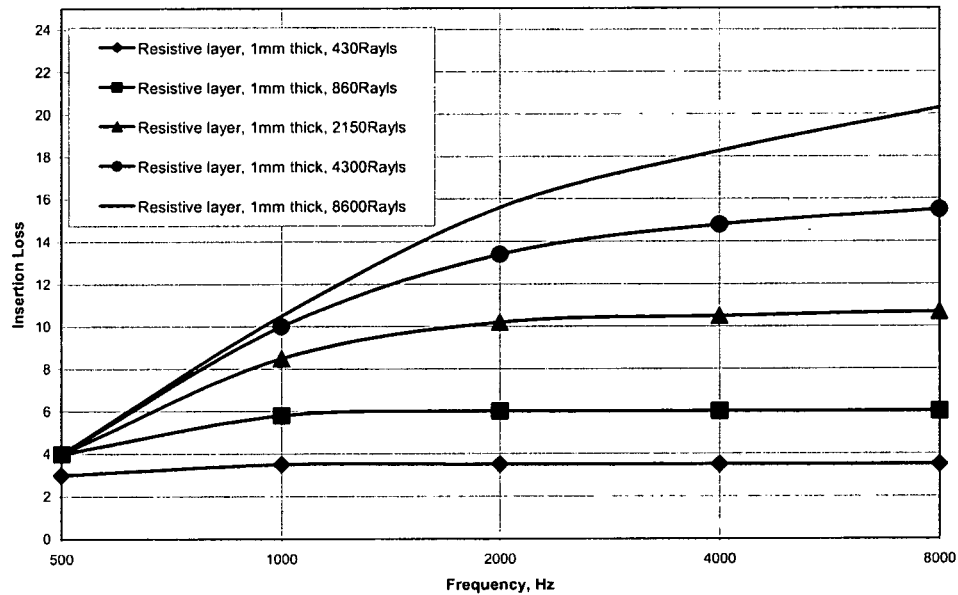
FIG. 7 is a graph of computed transmission loss vs. frequency (Hz) for the samples from Example 7.

Transmission loss, as shown in FIG. 7, is calculated in accordance with the technique described in David A. Bies and Colin H. Hansen, *Engineering Noise Control: Theory and Practice*, 3$^{rd}$ edition, Spon Press, 2003 (ISBN 0-415-26713-7). Transmission loss increases with increasing flow resistance.

Figure 8:
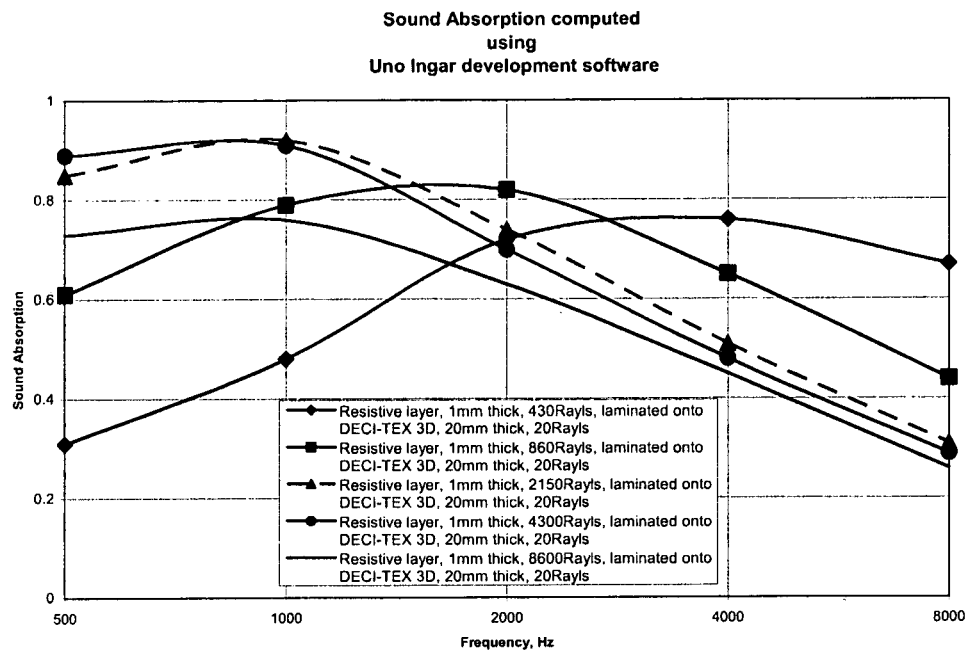
FIG. 8 is a graph of computed sound absorption vs. frequency (Hz) for the samples from Example 7.

FIG. 8 shows sound absorption as calculated in accordance with the technique described in Professor Uno Ingard, *Notes on Sound Absorption Technology*, Noise Control Foundation, 1994 (ISBN 0-931784-28-X). For the purposes of this example, the samples were laminated onto thermally bonded polyester with a flow resistivity of about 20 Rayls and a thickness of about 20 mm, which is marketed under the trade name DECI-TEX 3D.

The computed sound absorption was calculated for a diffuse field and shows a decreasing trend with increasing flow resistance, but even the high flow resistive sheets exhibit very useful sound absorption within most frequencies of interest to an acoustician.

An acoustician may find it necessary to choose a flow resistive sheet, in accordance with the described embodiments, that provides an appropriate compromise between the required transmission loss and the required sound absorption.

Figure 9:
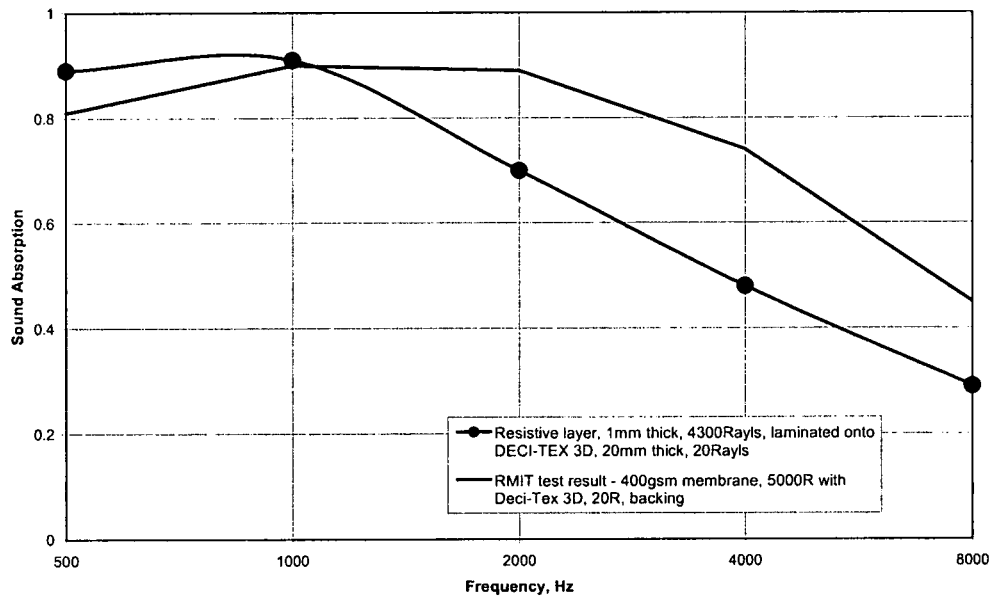
FIG. 9 is a graph of sound absorption vs. frequency (Hz) for a comparison test.

FIG. 9, shows a sound absorption comparison between the computed acoustic system and a similar system tested in a full scale reverberation chamber using Australian Standard 1045—*Method of measurement of absorption coefficients in a reverberation room*. For the purposes of this test, the samples were laminated onto thermally bonded polyester with a flow resistance of about 20 Rayls and a thickness of about 20 mm, which, as noted above, is marketed under the trade name DECI-TEX 3D.

There is a significant difference in higher frequencies between the results. This illustrates that high flow-resistive membranes perform acoustically better when tested compared to simple model numerical results.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Modifications to the described embodiments may be apparent to those skilled in the art, without departing from the spirit and scope of the described embodiments. The described embodiments are therefore intended to be exemplary and non-limiting when considered in the context of the appended claims.

The invention claimed is:

1. A method of forming a nonwoven material, the method comprising:
   receiving fibrous material comprising thermoplastic fibers;
   processing the fibrous material to produce short fibers having an average length of about 2 mm or less;
   adding the short fibers to a preformed web; and
   heating and optionally compressing the short fibers and preformed web to form a nonwoven material;
   wherein the nonwoven material has a density of from about 200 kg/m³ to about 2000 kg/m³ and a selected air flow resistivity between about 275,000 Rayls/m and about 3,000,000 Rayls/m.

2. The method of claim 1, wherein the fibrous material comprises fibrous waste material.

3. The method of claim 1, wherein the nonwoven material comprises a thermoformable short fiber nonwoven material.

4. The method of claim 3, wherein the thermoformable short fiber nonwoven material comprises a thermoplastic binder.

5. The method of claim 3, wherein the thermoformable short fiber nonwoven material comprises a thermoset binder.

6. The method of claim 1, wherein the processing comprises milling the fibrous material.

7. The method of claim 1, wherein the processing comprises milling the fibrous material to intermediate length fibers and then milling the intermediate length fibers to produce the short fibers.

8. The method of claim 1, wherein the short fibers comprise between 5% and less than 100% by weight of the nonwoven material.

9. The method of claim 8, wherein the short fibers comprise between 20% and 60% by weight of the nonwoven material.

10. The method of claim 9, wherein the short fibers comprise between 30% and 40% by weight of the nonwoven material.

11. The method of claim 1, wherein the nonwoven material is formed to have a thickness between 0.20 mm and 5 mm.

12. The method of claim 11, wherein the thickness is between 0.25 mm and 4 mm.

13. The method of claim 1, wherein the adding comprises scattering the short fibers on the preformed web.

14. The method of claim 1, further comprising adding one or more additives to the short fibers to treat the short fibers before adding the short fibers to the preformed web.

15. The method of claim 14, wherein the one or more additives are selected from the group consisting of: antimicrobial substances; flame-retardant substances; mineral fillers; adhesive powders; natural fibers; and further thermoplastic fibers.

16. The method of claim 1, wherein the fibrous material comprises one or more of a polyester material, an acoustic sheet material and a porous balk absorber material.

17. The method of claim 1, wherein the bulk density is between 250 kg/m$^3$ and 1,500 kg/m$^3$.

18. The method of claim 1, wherein the processed fibrous material is added to the preformed web such that fine fiber particles are retained in the nonwoven material and wherein the preformed web comprises fibers having a length of about 30 mm to about 100 mm.

19. A method of forming a nonwoven material, the method comprising:
   receiving fibrous material comprising thermoplastic fibers;
   processing the fibrous material to produce short fibers having an average length of about 2 mm or less;
   distributing the short fibers approximately evenly on a conveyor to provide a short fiber layer; and
   heating the short fiber layer to form a nonwoven material;
   wherein the nonwoven material has a selected air flow resistivity between about 275,000 Rayls/m and about 3,000,000 Rayls/m and a density of from about 200 kg/m$^3$ to about 2000 kg/m$^3$.

20. The method of claim 19, wherein the fibrous material comprises fibrous waste material.

21. A method of forming a nonwoven material, the method comprising:
   receiving fibrous material comprising fibrous waste material including bi-component fiber for facilitating bonding of the fibrous materials;
   processing the fibrous material to produce short fibers having an average length of about 2 mm or less, wherein the processing includes comminuting the fibrous waste material;
   distributing the short fibers across an area to form a precursor web; and
   bonding together at least some of the short fibers of the precursor web to form a nonwoven material by heating the short fibers to a temperature between about 100° C. and about 220° C.;
   wherein the nonwoven material has a selected air flow resistivity between about 275,000 Rayls/m and about 3,000,000 Rayls/m and a density of from about 200 kg/m$^3$ to about 2000 kg/m$^3$.

* * * * *

UNITED STATES PATENT AND TRADEMARK OFFICE
CERTIFICATE OF CORRECTION

| | | |
|---|---|---|
| PATENT NO. | : 9,315,930 B2 | Page 1 of 1 |
| APPLICATION NO. | : 13/132886 | |
| DATED | : April 19, 2016 | |
| INVENTOR(S) | : Michael William Coates et al. | |

It is certified that error appears in the above-identified patent and that said Letters Patent is hereby corrected as shown below:

On the Title Page

References Cited, Other Publications, Page 2, Line 19, "AU 1009322091" should be "AU 2009322091".

In the Claims

Column 25, Claim 16, Line 33, "balk" should be "bulk".

Signed and Sealed this
Fourteenth Day of June, 2016

Michelle K. Lee
*Director of the United States Patent and Trademark Office*